United States Patent
Liu et al.

(10) Patent No.: US 11,142,475 B2
(45) Date of Patent: Oct. 12, 2021

(54) PURIFICATION FILTER ELEMENT AND WATER PURIFICATION CUP

(71) Applicant: HANGZHOU ZEWO TRADING CO., LTD, Zhejiang (CN)

(72) Inventors: Yi Liu, Zhejiang (CN); Guanghui Liu, Zhejiang (CN)

(73) Assignee: HANGZHOU ZEWO TRADING CO., LTD, Hangzhou (CN)

( * ) Notice: Subject to any disclaimer, the term of this patent is extended or adjusted under 35 U.S.C. 154(b) by 0 days.

(21) Appl. No.: 16/875,920

(22) Filed: May 15, 2020

(65) Prior Publication Data

US 2020/0317554 A1    Oct. 8, 2020

Related U.S. Application Data

(63) Continuation of application No. PCT/CN2018/115775, filed on Nov. 16, 2018.

(30) Foreign Application Priority Data

Nov. 16, 2017  (CN) .......................... 201711141574.0

(51) Int. Cl.
*C02F 1/28* (2006.01)
*C02F 1/42* (2006.01)
(Continued)

(52) U.S. Cl.
CPC .............. *C02F 9/005* (2013.01); *C02F 1/002* (2013.01); *C02F 1/283* (2013.01); *C02F 1/42* (2013.01);
(Continued)

(58) Field of Classification Search
CPC .......... C02F 9/005; C02F 1/002; C02F 1/283; C02F 1/42; C02F 1/50; C02F 2001/427;
(Continued)

(56) References Cited

U.S. PATENT DOCUMENTS 5,149,437 A     9/1992  Wilkinson
5,811,004 A *   9/1998  Robertson ............... C02F 1/003
                                                      210/266
(Continued)

FOREIGN PATENT DOCUMENTS

CN      201375318 Y    1/2010
CN      201942585 U    8/2011
(Continued)

OTHER PUBLICATIONS

Machine Language Translation of CN201942585U (Xue et al), Aug. 2011 [retrieved on Jun. 10, 2021]. Retrieved from the internet: <thps://worldwide.espacenet.com>. (Year: 2011).*

*Primary Examiner* — Matthew O Savage (57) ABSTRACT

The present disclosure relates to water purification devices, and more particularly to a purification filter element and a water purification cup. The purification filter element includes a housing including a sterilization case, an activated carbon filtering section and an ion exchange resin filtering section from bottom to top. The sterilization case includes a first casing which is filled with brominated polystyrene hydantoin and a first filter screen. A gap is formed between the bottoms of the first casing and the housing. A flow limit hole is provided at the bottom of the housing. The water purification cup includes the purification filter element and a cup body. A water feed cup is detachably fastened in the cup body. A bottom of the water feed cup is connected to the housing of the purification filter element through a connection hole.

10 Claims, 5 Drawing Sheets

(51) Int. Cl.
*C02F 1/76* (2006.01)
*C02F 9/00* (2006.01)
*C02F 1/00* (2006.01)
*C02F 1/50* (2006.01)
*C02F 1/68* (2006.01)
*C02F 101/12* (2006.01)
*C02F 101/20* (2006.01)

(52) U.S. Cl.
CPC ............... *C02F 1/50* (2013.01); *C02F 1/685* (2013.01); *C02F 2001/427* (2013.01); *C02F 2101/12* (2013.01); *C02F 2101/203* (2013.01); *C02F 2201/006* (2013.01); *C02F 2303/04* (2013.01); *C02F 2305/00* (2013.01); *C02F 2307/04* (2013.01)

(58) Field of Classification Search
CPC ............ C02F 2101/12; C02F 2101/203; C02F 2201/006; C02F 2303/04; C02F 2305/00; C02F 2307/04; C02F 1/766; C02F 1/003; C02F 2201/004; C02F 2209/29; C02F 2201/002; C02F 2209/10; C02F 2103/02; C02F 2101/30; C02F 1/685
See application file for complete search history.

(56) References Cited

U.S. PATENT DOCUMENTS

| | | | |
|---|---|---|---|
| 8,043,502 B2* | 10/2011 | Nauta | C02F 1/003 210/232 |
| 2005/0072729 A1* | 4/2005 | Bridges | C02F 1/50 210/469 |
| 2008/0202992 A1* | 8/2008 | Bridges | C02F 1/688 210/85 |
| 2010/0006508 A1* | 1/2010 | Mitchell | C02F 1/003 210/669 |
| 2012/0048787 A1* | 3/2012 | Rajan | B01D 27/101 210/85 |

FOREIGN PATENT DOCUMENTS

| | | |
|---|---|---|
| CN | 205419996 U | 8/2016 |
| CN | 107698069 A | 2/2018 |
| CN | 208250021 P | 12/2018 |

* cited by examiner

PURIFICATION FILTER ELEMENT AND WATER PURIFICATION CUP

CROSS-REFERENCE TO RELATED APPLICATIONS

This application is a continuation of International Application No. PCT/CN2018/115775, filed on Nov. 16, 2018, which claims the benefit of priority from Chinese Patent Application No. 201711141574.0, filed on Nov. 16, 2017. The content of the aforementioned applications, including any intervening amendments thereto, is incorporated herein by reference.

TECHNICAL FIELD

This application relates to water purification devices, and more particularly to a purification filter element and a water purification cup comprising the same.

BACKGROUND OF THE DISCLOSURE

Water is the source of life. The municipal tap water is generally qualified to the national safety standards of drinking water when leaving the water works. Subsequently, the municipal tap water is transported to communities or households through pipelines and contacts with objects such as water taps, and however, the pipelines and the water taps are subject to corrosion, rusting and oxidization during the long-term use, thus causing the secondary pollution of the municipal tap water. To ensure the safety of drinking water, it is required to remove harmful substances such as solids, heavy metals of the iron rust from the tap water. At present, commercially available filtration techniques for tap water mainly include: 1) reverse osmosis which achieves the purification of tap water by applying some pressure to the tap water to allow water molecules and ionized mineral elements to pass through the reverse osmosis and block most dissolved inorganic salts (including heavy metals) and organics; 2) nanofiltration, a membrane separation technique requiring pressure, which has a nano-sized pore diameter and a molecular weight cut-off of 80-1000; 3) filter elements which have various types corresponding to different purification systems, and generally have a technical process using non-woven fabric, granular activated carbon filter for rough filtration, nanofiltration membrane or reverse osmosis membrane and postposition of granular activated carbon filter. Such filter element has higher requirements for the water intake pressure, which is generally upon the pressure of the tap water. Therefore, booster pumps are required to be added, causing the increase of the cost.

Thus, the existing filter elements have high requirements for the water pressure during the operation. Moreover, bacteria, viruses and algae will easily grow in the existing filter elements, resulting in the growing of aquatic microorganisms.

SUMMARY OF THE DISCLOSURE

An object of the disclosure is to provide a purification filter element and a water purification cup to overcome the following defects. The higher water pressure is required during the operation of the existing purification filter element. The aquatic microorganism content is over the limit since bacteria, viruses and algae easily grow in the existing filter elements.

The disclosure provides a purification filter element, comprising a housing having an opening, wherein a sterilization case is detachably fixed in the housing and is close to a bottom of the housing;

wherein the sterilization case comprises a first casing which is filled with brominated polystyrene hydantoin and a first filter screen which is detachably connected to and matches with the first casing; the first casing is matched with an inner wall of the housing, and a first through hole is provided at a bottom of the first casing; a gap is formed between the bottom of the first casing of the sterilization case and the bottom of the housing; and a flow limit hole is arranged at the bottom of the housing; and an ion exchange resin filtering section and an activated carbon filtering section are successively provided in the housing from the first filter screen to the opening.

In some embodiments, a fastener is provided in the housing near the sterilization case, and is configured to fasten and fix the sterilization case in the housing.

In some embodiments, a polypropylene (PP) layer and a press plate are successively provided between the first filter screen and the ion exchange resin filtering section; the PP layer is arranged between the press plate and the first filter screen; shapes of the PP layer and the press plate are matched with corresponding cross sections of the housing; and the fastener is further configured to fasten the press plate.

In some embodiments, the activated carbon filtering section comprises an activated carbon case which is detachably fixed in the housing near the opening; wherein the activated carbon case comprises a second casing which is filled with activated carbon particles and a second filter screen which is detachably connected to and matches with the second casing; a second through hole is arranged at bottom of the second casing and is configured to allow water to pass through; and the ion exchange resin filtering section is enclosed by the bottom of the second casing, a side wall of the housing and the first filter screen, and is filled with ion exchange resins.

In some embodiments, an exhaust vent is provided on the second filter screen; and an exhaust slot is provided at an outer wall of the activated carbon case to allow an external environment to communicate with the ion exchange resin filtering section.

In some embodiments, a sponge layer is provided between the activated carbon particles in the activated carbon case and the second filter screen; and a shape of the sponge layer is matched with a cross section of the activated carbon case.

In some embodiments, the housing is a truncated cone; and the ion exchange resin filtering section successively comprises a section A, a section B and a section C which are parallel to each other, and capacities of the section A, the section B and the section C are reduced successively.

In some embodiments, an external thread is provided at an outer wall of the housing and close to the opening; and a seal ring is provided at a lower part of the external thread and is fixed on the housing through melting.

In some embodiments, a protrusion which is circular is provided at the outer wall of the housing; a holding slot which is circular is provided on the protrusion; the seal ring is arranged in the holding slot and is fixed on the housing through melting.

The disclosure further provides a water purification cup, comprising: the purification filter element and a cup body, wherein a water feed cup is detachably fastened in the cup body; a connection hole is provided at a bottom of the water feed cup; the purification filter element is arranged in the cup body; an end of the housing having the opening is detachably connected in the connection hole in sealed manner; and a spout is provided at a rim of the cup body and communicated with a cavity of the cup body.

The present invention has the following beneficial effects.

The purification filter element includes: the housing configured to contain filtering materials; the sterilization case configured to remove bacteria, viruses and algae; the activated carbon filtering section configured to remove residual chlorine, organics, iron rust, colloids and sediments; and the ion exchange resin filtering section configured to remove salts (metal ions) in the tap water. Initially, the first filter screen is mounted on the first casing to form an enclosed cavity to fill brominated polystyrene hydantoin, and the first casing is embedded and fixed in the housing.

During the water purification, the tap water is poured into the housing from the opening, and flows downward under the gravity. The tap water flows through the activated carbon filtering section to remove the residual chlorine, organics, iron rust, colloids and sediments. Specifically, the activated carbon has 20-30 meshes and an iodine number of more than. Then, the tap water passes through the activated carbon filtering section and enters the ion exchange resin filtering section. Ion exchange resins are formed by uniformly mixing anion exchange resins and cation exchange resins according to a certain proportion. The ion exchange resins react with the ions to remove the ions in the tap water, so that the treated tap water has a total dissolved solids (TDS) of 0. The tap water continually flows to the sterilization case through the first filtering screen and contacts with the brominated polystyrene hydantoin to remove microorganisms such as bacteria, viruses and algae. After all the above treatments, the tap water flows through the first through hole of the first casing to the bottom of the housing and leaves the housing from the flow limit hole. At this time, the purification for the tap water is finished.

In this disclosure, the tap water flows through the purification materials without any external forces due to the gravity; and the sterilization case effectively removes microorganisms such as bacteria, viruses and algae in the purification filter element.

The water purification cup includes the cup body for containing the purified water, the purification filter element for purifying the tap water and the water feed cup for connecting the purification filter element with the cup body. The housing of the purification filter element and the connection hole at the bottom of the water feed cup are detachably connected. During the purification, the tap water is added to the water feed cup, flows through the connection hole at the bottom of the water feed cup to the housing of the purification filter element, to the activated carbon filtering section, to the ion exchange resin filtering section and to the sterilization case from top to bottom to successively remove remanent chlorine, organics, iron rust, colloids, sediments, salts and microorganisms. The purified water flows to the cup body through the flow limit hole at the bottom of the housing. When the user needs water, the cup body is leaned to allow the purified water to flow to the spout, so that the user can drink the purified water. No external booster pump is required in the water purification cup. Moreover, the sterilization case in the purification filter element is capable of killing microorganisms growing in the purification filter element, such as bacteria, viruses and algae, to obtain the purified water.

BRIEF DESCRIPTION OF THE DRAWINGS

The technical solutions in the prior art or in embodiments of the disclosure will be more clearly described below with reference to the drawings. Obviously, described below are merely some embodiments of the disclosure, and various variations and modifications of the disclosure can be made by those skilled in the art without departing from the spirit and scope of the disclosure.

In the drawings, 100—purification filter element; 110—opening; 1—housing; 2—sterilization case; 3—ion exchange resin filtering section; 260—ion exchange resins; 4—activated carbon filtering section; 5—activated carbon case; 6—PP layer; 7—sponge layer; 8—sealing ring; 9—press plate; 11—flow limit hole; 12—fastener; 21—first casing; 210—first through hole; 22—first filter screen; 220—brominated polystyrene hydantoin; 51—second casing; 511—exhaust slot; 52—second filter screen; 250—activated carbon particles; 521—exhaust vent; 81—inverted U-shaped sealing ring; 82—straight R-shaped sealing ring; 83—flat sealing ring; 84—R-shaped sealing ring; 85—inverted V-shaped sealing ring; 310—section A, 320—section B; 330—section C; 120—external thread; 130—protrusion; 132—holding slot; 300—cup body; 340—spout; 400—water feed cup; 410—connection hole.

DETAILED DESCRIPTION OF EMBODIMENTS

The technical solutions of the embodiments of the present disclosure will be clearly and fully described with reference to the accompanying drawings. The described embodiments are merely a part of the embodiments of the present disclosure. It should be noted that various variations and modifications of the disclosure made by those skilled in the art without departing from the spirit and scope of the disclosure should fall within the scope of the disclosure.

It should be noted that all directional terms in the embodiments of the disclosure, such as "center", "above", "below", "left", "right", "vertical", "horizontal", "inner" and "outer", are merely intended to illustrate relative positions as shown in the drawings but not to limit the present disclosure, and should not be interpreted as indication or implication of specific directions. Moreover, terms such as "first" and "second" are only used for illustration, and should not be interpreted as indication or implication of relative importance or the number of the technical features.

In the present disclosure, it should be noted that unless specified, terms "provide", "communicate" and "connect" should be understood broadly. For example, "fix" may result in a fixed connection, a detachable connection, or an integrated configuration of elements. The elements may be connected mechanically or electrically; or directly connected or indirectly connected through an intermediate medium. Alternatively, two elements may be in communication or interact with each other unless specified. For the skilled in the art, the specific meanings of the above terms in the present disclosure can be understood according to specific conditions.

Embodiment 1

Figure 1:
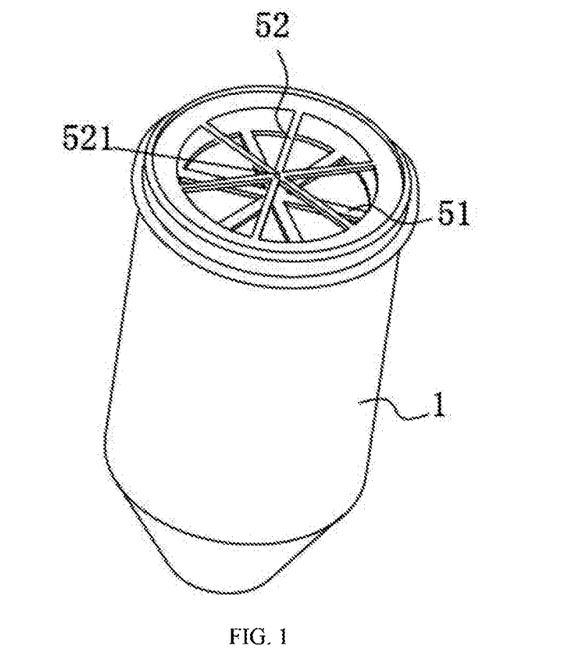
FIG. 1 is a perspective view of a purification filter element according to embodiment 1 of the present disclosure.
Figure 2:
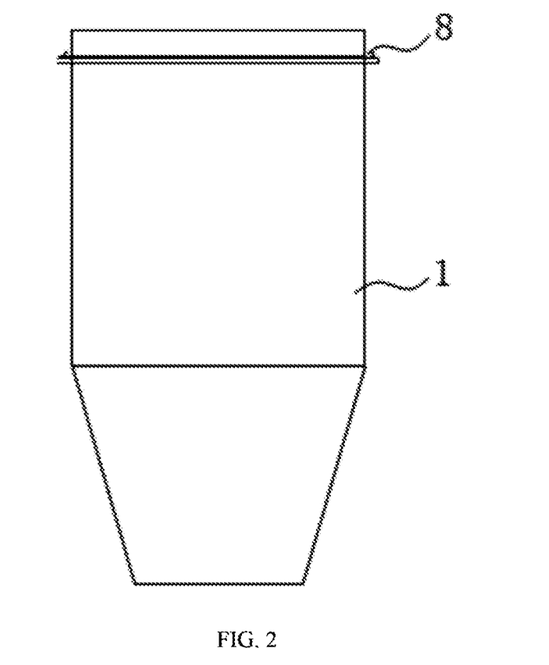
FIG. 2 is a schematic diagram of the purification filter element according to embodiment 1 of the present disclosure.
Figure 3:
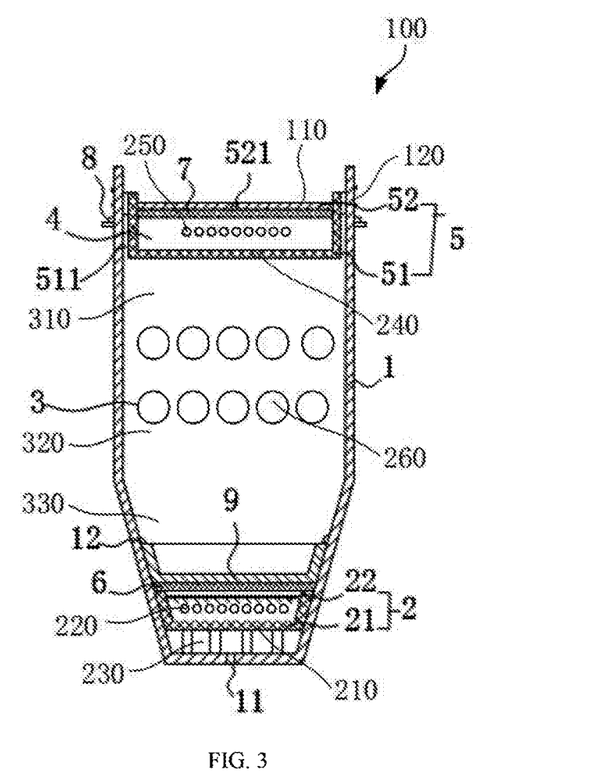
FIG. 3 is a sectional view of the purification filter element according to Embodiment 1 of the present disclosure.

This embodiment provides a purification filter element 100, as shown in FIGS. 1-3, including a housing 1 having an opening 110. A sterilization case 2 is detachably fixed in the housing 1 and close to a bottom of the housing 1. The sterilization case 2 includes a first casing 21 which is filled with brominated polystyrene hydantoin 220 and a first filter screen 22 which is matched with and detachably connected to the first casing 21. A first through hole 210 is provided at a bottom of the first casing 21 to allow water to pass through. The first casing 21 is matched with an inner structure of the housing 1. A gap 230 is formed between the bottom of the first casing 21 and a bottom of the housing 1. A flow limit hole 11 is provided at the bottom of the housing 1. An ion exchange resin filtering section 3 and an activated carbon filtering section 4 are successively provided in the housing 1 from the first filter screen 22 to the opening 110.

The purification filter element 100 includes: the housing 1 configured to contain filtering materials; the sterilization case 2 configured to remove bacteria, viruses and algae; the activated carbon filtering section 4 configured to remove residual chlorine, organics, iron rust, colloids and sediments; and the ion exchange resin filtering section 3 configured to remove salts (metal ions) in the tap water. Initially, the first filter screen 22 is mounted on the first casing 21 to form an enclosed cavity to fill brominated polystyrene hydantoin 220, and the first casing 21 is embedded and fixed in the housing 1.

During the water purification, the tap water is poured into the housing 1 from the opening 110, and flows downward under the gravity. The tap water flows through the activated carbon filtering section 4 to remove the residual chlorine, organics, iron rust, colloids and sediments. Specifically, the activated carbon has 20-30 meshes and an iodine number of more than 1000. Then, the tap water passes through the activated carbon filtering section 4 and enters the ion exchange resin filtering section 3. Ion exchange resins 260 are formed by uniformly mixing anion exchange resins and cation exchange resins according to a certain proportion. The ion exchange resins 260 react with the ions to remove the ions in the tap water, so that the treated tap water has a total dissolved solids (TDS) of 0. The tap water continually flows to the sterilization case 2 through the first filtering screen 22 and contacts with the brominated polystyrene hydantoin 220 to remove microorganisms such as bacteria, viruses and algae. After all the above treatments, the tap water flows through the first through hole 210 of the first casing 21 to the bottom of the housing 1 and leaves the housing 1 from the flow limit hole 11. At this time, the purification for the tap water is finished.

In this disclosure, the tap water flows through the purification materials without any external forces due to the gravity; and the sterilization case 2 effectively removes microorganisms such as bacteria, viruses and algae in the purification filter element 100.

The flow limit hole 11 is configured to let the water out and limit the flow rate of the purified water. When the flow limit hole 11 is smaller, the flow rate of the purified water is smaller at the flow limit hole 11, so the tap water will stay in the housing 1 for a longer time, lengthening the purification time for the tap water.

In this embodiment, as shown in FIG. 3, a fastener 12 is provided in the housing 1, and is configured to fasten and fix the sterilization case 2 in the housing 1. Specifically, the fastener 2 may be several convex elements on an inner wall of the housing 1. The convex elements are arranged evenly at a circumference of the inner wall of the housing 1. The first casing 21 can be made of polyethylene and is deformable. During the assembly of the sterilization case 2, the first casing 21 is pressed downward into the housing 1 to extrude the convex elements until the first casing 21 reaches a lower part of the convex elements, so that the convex elements tightly fasten the first casing 21, keeping the sterilization case 2 from falling out of the housing 1, thereby ensuring the removal of microorganisms in the sterilization case 2.

In this embodiment, a polypropylene (PP) layer 6 and a press plate 9 are successively provided between the first filter screen 22 and the ion exchange resin filtering section 3. The PP layer 6 is provided between the press plate 9 and the first filter screen 22. Shapes of the PP layer 6 and the press plate 9 are matched with the cross section of the housing 1. The fastener 12 is also configured to fasten the press plate 9. The ion exchange resins 260 are small particles; the PP layer 6 is arranged below the ion exchange resins 260 to limit the position of the ion exchange resins 260, which prevents the ion exchange resins 260 from moving downward to the sterilization case 2 to influence the operation of sterilization materials in the sterilization case 2. The press plate 9 limits the position of the PP layer 6 to prevent the PP layer 6 from moving or being folded in the housing 1, so that the ion exchange resins 260 are ensured to be separated by the PP layer 6.

In this embodiment, as shown in FIG. 3, the activated carbon filtering section 4 includes an activated carbon case 5 which is detachably fixed near the opening 110 in the housing 1. The activated carbon case 5 includes a second casing 51 which is filled with activated carbon particles 250 and a second filter screen 52 which is detachably connected to the second casing 51. A second through hole 240 is provided at a bottom of the second casing 51 which is matched with the second casing 51 in a detachable manner. The ion exchange resin filtering section 3 is filled with the ion exchange resins 260, and is enclosed by the bottom of the second casing 51, a side wall of the housing 1 and the first filter screen 22. During the use of the purification filter element 100, the tap water firstly flows through the second filter screen 52 of the activated carbon case 5. The second filter screen 52 keeps the activated carbon particles 250 from falling out, and filters the tap water initially to remove larger and visible substances, avoiding the visible substances pollute and block the activated carbon particles 250. Then the tap water flows through the activated carbon particles 250 for adsorption filtering, and through the ion exchange resins 260 for reaction for purification. The subsequent purification process has been described above in detail.

Figure 4:
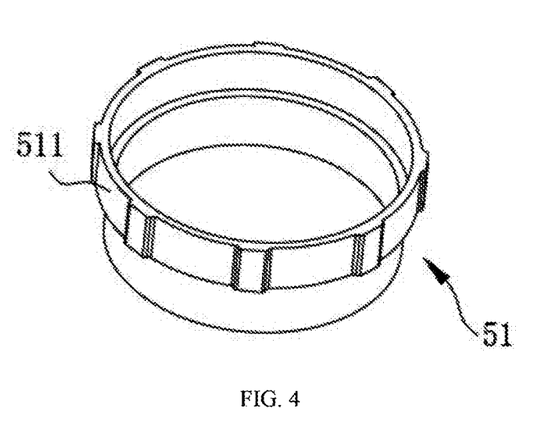
FIG. 4 is a perspective view of a second casing in FIG. 3 according to Embodiment 1 of the present disclosure, in which an exhaust slot is arranged on the second casing.

In this embodiment, as shown in FIGS. 1, 3 and 4, an exhaust vent 521 is provided on the second filter screen 52; and an exhaust slot 511 is provided at an outer wall of the activated carbon case 5, so as to allow the external environment to communicate with the ion exchange resin filtering section 3. During the use of the purification filter element 100, due to the influence of water, the ion exchange resins 260 moves downward in the ion exchange resin filtering section 3, so that the density of the ion exchange resins 260 is increased and the volume of the ion exchange resins 260 is reduced. A space is formed between an upper part of the ion exchange resin filtering section 3 and the bottom of the activated carbon case 5. When the purification filter element 100 is idle, the space is filled with air. When the purification filter element 100 works again, the tap water flows from the upper part of the housing 1 to the second filter screen 52, then to the activated carbon case 5 and the ion exchange resin filtering section 3 through meshes on the second filter screen 52. The air in the ion exchange resin filtering section 3 moves upward successively through the activated carbon case 5 and the exhaust vent 521, and leaves the housing 1, which effectively reduces the water film of tap water which is caused by the smaller meshes of the second filter screen 52 and the air under the second filter screen 52. The tap water will fail to enter the activated carbon case 5 and spill out the housing 1, resulting in the failure of the purification. Similarly, the activated carbon case 5 is detachably fixed in the housing 1, and the exhaust slot 511 is provided at an outer wall of the activated carbon case 5. When the tap water flows to the second filter screen 52, the air at the upper part of the ion exchange resins 260 is pressed to leave the housing 1 through the exhaust slot 511, which reduces the air pressure formed in the housing 1 to avoid the situation that the tap water cannot enter the housing due to the air pressure.

Specifically, a plurality of reinforcing ribs which are radially arranged are provided on the second filter screen 52. The reinforcing ribs start from a center of the second filter screen 52. The exhaust vent 521 is provided at the center of the second filter screen 52 and has a diameter of 2-3 mm.

In this embodiment, as shown in FIG. 3, a sponge layer 7 is provided between the activated carbon particles 250 and the second filter screen 52 in the activated carbon case 5; and the shape of the sponge layer 7 is matched with the corresponding cross section of the activated carbon case 5. The sponge layer 7 can initially remove larger particles in the tap water and keep the activated carbon particles 250 from falling out through the second filter screen 52.

In this embodiment, the housing 1 is a truncated cone; and the ion exchange resin filtering section 3 successively includes a section A 310, a section B 320 and a section C 330 which are parallel to each other, and the capacities thereof are reduced successively. The ion exchange resins 260 will be saturated after obtaining a certain water. The tap water flows through the section A 310, the section B 320 and the section C 330 from top to bottom, so that the concentrations of the salt ions in the tap water are reduced successively, i.e. the ion exchange resins 260 in the section A 310 react more completely with the salt ions in the tap water than the section B 320 and the section C 330. The capacities of the ion exchange resins 260 in the section A 310, the section B 320 and the section C 330 are reduced successively, the tap water in the section C 330 has a lower concentration of the salt ions, and correspondingly, the section C has less ion exchange resins 260. Therefore, the section A 310, the section B 320 and the section C 330 reach the saturation state in approximately the same time, avoiding the waste of the ion exchange resins 260 when replacing the ion exchange resins 260 or the purification filter element 100.

Specifically, an external thread 120 is provided at an outer wall of the housing 1 close to the opening 110; and a seal ring 8 is provided on a lower part of the external thread 120 and is fixed on the housing 1 through melting. The housing 1 can be connected to other parts through threaded connection. The melting herein refers to a hot melting in which a secondary injection molding of the raw material (the raw material can be elastic food grade polypropylene) is operated after melting under high temperature. The color of the raw material is retained, and the seal ring 8 is reshaped and fixed at the outer wall of the housing 1 close to the lower part of the external thread 120. The seal ring 8 and the housing 1 are integrally formed and nondetachable. There is not gap between the seal ring 8 and the housing 1, leaving no room for the bacteria to grow, which facilitates the cleaning for the seal ring, and ensures the sealing between the seal ring 8 and the housing 1 to reduce water leakages.

Figure 5:
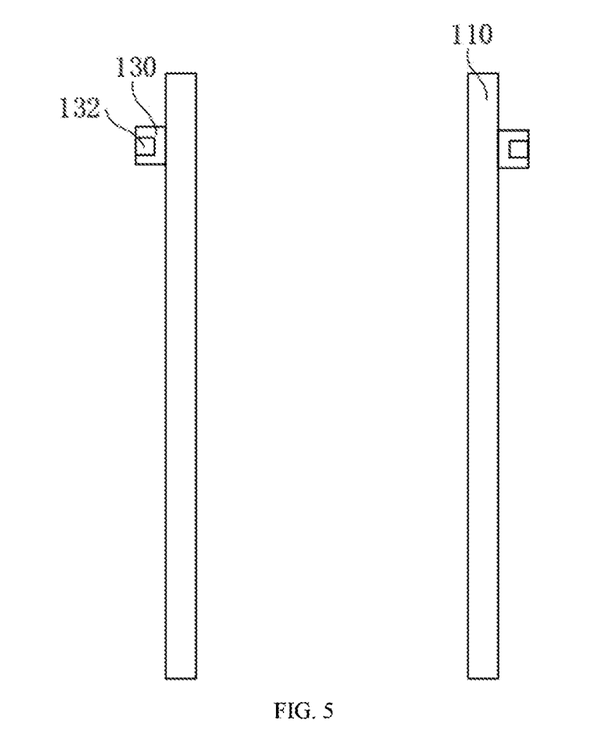
FIG. 5 is a partial view of the purification filter element according to an embodiment of the present disclosure.

Moreover, in this embodiment, a protrusion 130 which is circular is provided outside the housing 1; a holding slot 132 which is circular is provided on the protrusion 130; the seal ring 8 is arranged in the holding slot 132 and is fixed on the housing 1 by color melting. The housing 1 can be connected to other parts through inserted manner. The seal ring 8 is arranged in the holding slot 132 on the protrusion 130 through melting. When the protrusion 130 located at the opening 110 of the housing 1 is tightly inserted to another part, the seal ring 8 is extruded to the inner wall of the part to realize the sealing. The seal ring 8 and the housing 1 are integrally formed and nondetachable. There is not gap between the seal ring 8 and the housing 1, leaving no room for the bacteria to grow, which facilitates the cleaning for the seal ring 8, and ensures the sealing between the seal ring 8 and the housing 1 to reduce water leakages.

Figure 6:
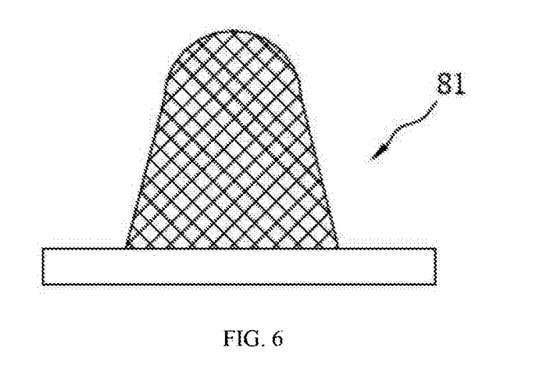
FIG. 6 is a sectional view of a sealing ring in FIG. 2 according to an embodiment of the present disclosure, in which the sealing ring has an inverted U-shaped cross section.
Figure 7:
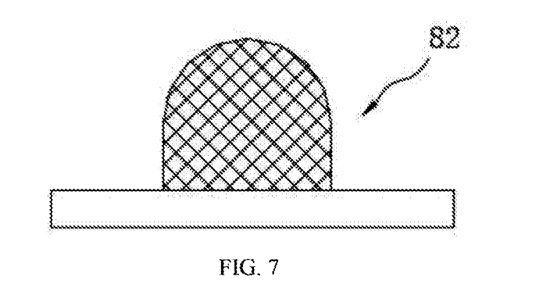
FIG. 7 is a sectional view of the sealing ring in FIG. 2 according to an embodiment of the present disclosure, in which the sealing ring has a straight R-shaped cross section.
Figure 8:
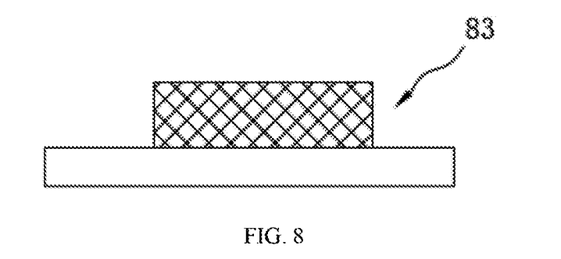
FIG. 8 is a sectional view of the sealing ring in FIG. 2 according to an embodiment of the present disclosure, in which the sealing ring is a flat washer.
Figure 9:
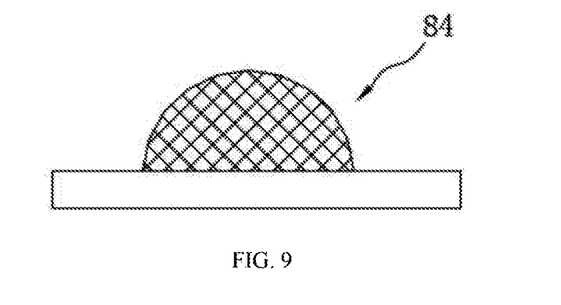
FIG. 9 is a sectional view of the sealing ring in FIG. 2 according to an embodiment of the present disclosure, in which the sealing ring has an R-shaped cross section.
Figure 10:
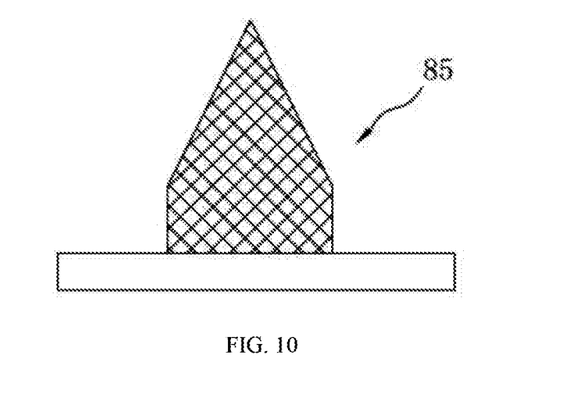
FIG. 10 is a sectional view of the sealing ring in FIG. 2 according to an embodiment of the present disclosure, in which the sealing ring has an inverted V-shaped cross section.

Specifically, the seal ring 8 can be an inverted U-shaped sealing ring 81 as shown in FIG. 6, a straight R-shaped sealing ring 82 as shown in FIG. 7, a flat sealing ring 83 as shown in FIG. 8, a R-shaped sealing ring 84 as shown in FIG. 9, or an inverted V-shaped sealing ring 85 as shown in FIG. 10.

Embodiment 2

Figure 11:
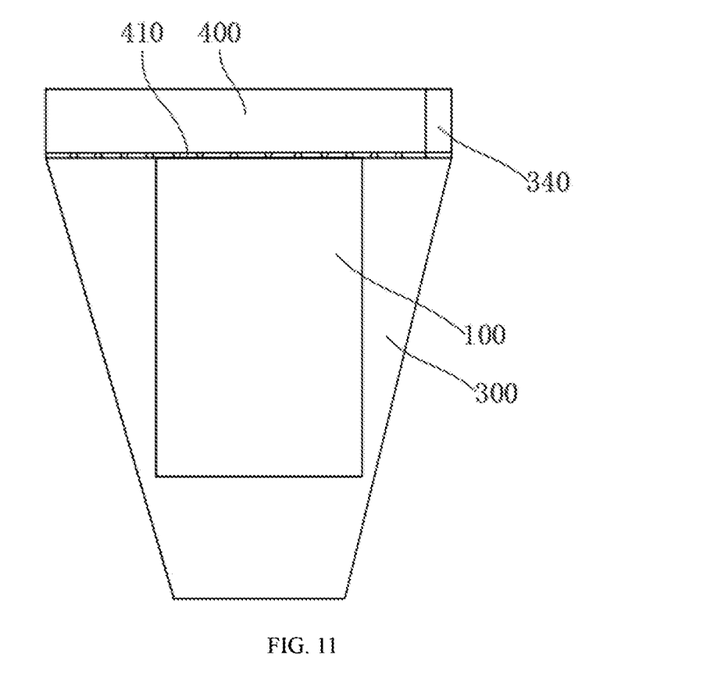
FIG. 11 is a schematic diagram of a water purification cup according to an embodiment of the present disclosure.

This embodiment provides a water purification cup, including: the purification filter element 100 and a cup body 300. A water feed cup 400 is detachably fastened in the cup body 300. The purification filter element 100 is arranged in the water feed cup 400. A connecting hole 410 is provided at a bottom of the water feed cup 400. An end of the housing 1 having the opening is detachably connected to the connecting hole 410 in sealed manner. A spout 340 is provided at a rim of the cup body 300 and communicated with the cavity of the cup body 300.

The water purification cup includes the cup body 300 for containing the purified water, the purification filter element 100 for purifying the tap water and the water feed cup 400 for connecting the purification filter element 100 with the cup body 300. The housing 1 of the purification filter element 100 and the connection hole 410 at the bottom of the water feed cup 400 are detachably connected. During the purification, the tap water is added to the water feed cup 400, flows through the connection hole 410 at the bottom of the water feed cup 400 to the housing 1 of the purification filter element 100, and to the activated carbon filtering section 4, to the ion exchange resin filtering section 3 and to the sterilization case 2 from top to bottom to successively remove remanent chlorine, organics, iron rust, colloids, sediments, salts and microorganisms. The purified water flows to the cup body 300 through the flow limit hole 11 at the bottom of the housing 1. When the user needs water, the cup body 300 is leaned to allow the purified water to flow to the spout 340, so that the user can drink the purified water. No external booster pump is required in the water purification cup. Moreover, the sterilization case 2 in the purification filter element 100 is capable of killing microorganisms growing in the purification filter element 100 such as bacteria, viruses and algae to ensure the safety of drinking water.

It should be noted that the above examples are merely intended to illustrate the present disclosure, and the specific and detailed description thereof is not intended to limit the scope of the disclosure. It should be understood that any changes, replacements and modifications made without departing from the spirit of the application should fall within the scope of the application defined by the appended claims.

What is claimed is:

1. A purification filter element, comprising a housing having an opening;
    wherein a sterilization case is detachably fixed in the housing and is close to a bottom of the housing; and the sterilization case comprises a first casing which is filled with brominated polystyrene hydantoin and a first filter screen which is detachably connected to and matches with the first casing;
    the first casing is fitted in the housing, and a first through hole is provided at a bottom of the first casing; and a gap is formed between the bottom of the first casing of the sterilization case and the bottom of the housing;
    a flow limit hole is arranged at the bottom of the housing; and
    an ion exchange resin filtering section and an activated carbon filtering section are successively provided in the housing from the first filter screen to the opening of the housing.

2. The purification filter element of claim 1, wherein a fastener is provided in the housing near the sterilization case, and is configured to fasten and fix the sterilization case in the housing.

3. The purification filter element of claim 2, wherein a polypropylene (PP) layer and a press plate are successively provided between the first filter screen and the ion exchange resin filtering section; the PP layer is arranged between the press plate and the first filter screen; shapes of the PP layer and the press plate are matched with corresponding cross sections of the housing; and the fastener is further configured to fasten the press plate.

4. The purification filter element of claim 1, wherein the activated carbon filtering section comprises an activated carbon case which is detachably fixed in the housing near the opening; wherein the activated carbon case comprises a second casing which is filled with activated carbon particles and a second filter screen which is detachably connected to and matches with the second casing; a second through hole is arranged at bottom of the second casing and is configured to allow water to pass through; and
    the ion exchange resin filtering section is enclosed by the bottom of the second casing, a side wall of the housing and the first filter screen, and is filled with ion exchange resins.

5. The purification filter element of claim 4, wherein an exhaust vent is provided on the second filter screen; and an exhaust slot is provided at an outer wall of the activated carbon case to allow an external environment to communicate with the ion exchange resin filtering section.

6. The purification filter element of claim 4, wherein a sponge layer is provided between the activated carbon particles in the activated carbon case and the second filter screen; and a shape of the sponge layer is matched with a cross section of the activated carbon case.

7. The purification filter element of claim 1, wherein the housing is a truncated cone; and the ion exchange resin filtering section successively comprises a section A, a section B and a section C which are parallel to each other, and capacities of the section A, the section B and the section C are reduced successively.

8. The purification filter element of claim 1, wherein an external thread is provided at an outer wall of the housing and close to the opening; and a seal ring is provided at a lower part of the external thread and is fixed on the housing through melting.

9. The purification filter element of claim 8, wherein a protrusion which is circular is provided at the outer wall of the housing; a holding slot which is circular is provided on the protrusion; and the seal ring is arranged in the holding slot.

10. A water purification cup, comprising: the purification filter element of claim 1 and a cup body;
    wherein a water feed cup is detachably fastened in the cup body; a connection hole is provided at a bottom of the water feed cup; the purification filter element is arranged in the cup body; an end of the housing is detachably connected in the connection hole in sealed manner; and a spout is provided at a rim of the cup body and communicated with a cavity of the cup body.

* * * * *